US012674744B2

(12) United States Patent
Shi et al.

(10) Patent No.: US 12,674,744 B2
(45) Date of Patent: Jul. 7, 2026

(54) CUVETTE ASSEMBLY, FLOW CELL COMPRISING THE CUVETTE ASSEMBLY, AND SAMPLE PROCESSOR CONTAINING THE CUVETTE ASSEMBLY OR THE FLOW CELL

(71) Applicant: BECKMAN COULTER BIOTECHNOLOGY (SUZHOU) CO., LTD., Suzhou (CN)

(72) Inventors: Wei Shi, Suzhou (CN); Xianghua Shi, Suzhou (CN); Jianhua Wang, Suzhou (CN); Linqun Tang, Suzhou (CN)

(73) Assignee: Beckman Coulter Biotechnology (Suzhou) Co., Ltd., Suzhou (CN)

( * ) Notice: Subject to any disclaimer, the term of this patent is extended or adjusted under 35 U.S.C. 154(b) by 262 days.

(21) Appl. No.: 18/262,555

(22) PCT Filed: Nov. 1, 2021

(86) PCT No.: PCT/CN2021/127868
§ 371 (c)(1),
(2) Date: Jul. 21, 2023

(87) PCT Pub. No.: WO2022/156303
PCT Pub. Date: Jul. 28, 2022

(65) Prior Publication Data
US 2024/0094113 A1      Mar. 21, 2024

(30) Foreign Application Priority Data
Jan. 22, 2021    (CN) .......................... 202120186046.2

(51) Int. Cl.
*G01N 21/03* (2006.01)
*G01N 21/05* (2006.01)

(52) U.S. Cl.
CPC ......... *G01N 21/0303* (2013.01); *G01N 21/05* (2013.01)

(58) Field of Classification Search
CPC ............. G01N 15/1434; G01N 15/149; G01N 2015/1006; G01N 2021/054; G01N 21/0303; G01N 21/05
(Continued)

(56) References Cited

U.S. PATENT DOCUMENTS 4,318,481 A   3/1982  Lombardo et al.
4,538,733 A   9/1985  Hoffman
(Continued)

FOREIGN PATENT DOCUMENTS

CN       1950690 A    4/2007
CN     104862273 A    8/2015
(Continued)

OTHER PUBLICATIONS

International Search Report and Written Opinion for PCT/CN2021/127868 (Jan. 26, 2022).

*Primary Examiner* — Sunghee Y Gray
(74) *Attorney, Agent, or Firm* — Merchant & Gould P.C.

(57)                ABSTRACT
The invention relates to a cuvette assembly for a sample processor, a flow cell for a sample processor comprising the cuvette assembly, and a sample processor comprising the cuvette assembly or the flow cell. The cuvette assembly comprises a cuvette body and a reflector. The cuvette body is in the shape of a rectangular parallelepiped and comprises a sample detection channel vertically penetrating the cuvette body. The cuvette body has long sides and short sides in a horizontal section. The reflector has a flat surface attached to a first side surface extending along one of the long sides of the cuvette body and a spherical surface that is opposite to the flat surface and has a truncated lower half. The reflector
(Continued)

is positioned so that it is flush with a lower surface of the cuvette body and a center of sphere of the spherical surface falls into the sample detection channel, and the reflector extends along the long side and exceeds the short side.

22 Claims, 7 Drawing Sheets

(58) Field of Classification Search
USPC ........................................................ 356/246
See application file for complete search history.

(56) References Cited

U.S. PATENT DOCUMENTS

| | | | |
|---|---|---|---|
| 5,985,216 | A | 11/1999 | Rens et al. |
| 6,079,836 | A | 6/2000 | Burr et al. |
| 6,767,188 | B2 | 7/2004 | Vrane et al. |
| 6,880,414 | B2 | 4/2005 | Norton |
| 7,201,875 | B2 | 4/2007 | Norton et al. |
| 7,417,734 | B2 | 8/2008 | Kanda |
| 7,443,491 | B2 | 10/2008 | Kanda |
| 7,544,326 | B2 | 6/2009 | Norton et al. |
| 7,639,358 | B2 | 12/2009 | Kanda |
| 7,776,268 | B2 | 8/2010 | Rich |
| 7,799,575 | B2 | 9/2010 | Jiang |
| 7,821,631 | B1 | 10/2010 | Javadi |
| 7,990,525 | B2 | 8/2011 | Kanda |
| 8,140,300 | B2 | 3/2012 | Dunne et al. |
| 8,187,888 | B2 | 5/2012 | Rich |
| 8,233,146 | B2 | 7/2012 | Chen |
| 8,303,894 | B2 | 11/2012 | Rich |
| 8,358,412 | B2 | 1/2013 | Kanda |
| 8,528,427 | B2 | 9/2013 | Vrane et al. |
| 8,564,776 | B2 | 10/2013 | Graves et al. |
| 8,665,439 | B2 | 3/2014 | Luscher |
| 8,748,183 | B2 | 6/2014 | Durack et al. |
| 8,767,212 | B2 | 7/2014 | Kanda et al. |
| 9,034,259 | B2 | 5/2015 | Kanda |
| 9,092,034 | B2 | 7/2015 | Vrane et al. |
| 9,170,187 | B2 | 10/2015 | Yan et al. |
| 9,207,166 | B2 | 12/2015 | Bardell et al. |
| 9,429,276 | B2 | 8/2016 | Katsumoto |
| 9,523,677 | B2 | 12/2016 | Ball et al. |
| 9,562,860 | B1 | 2/2017 | Pangarkar et al. |
| 9,645,080 | B2 | 5/2017 | Matula et al. |
| 9,784,659 | B2 | 10/2017 | Tanase et al. |
| 9,816,911 | B2 | 11/2017 | Chen et al. |
| 9,897,530 | B2 | 2/2018 | Durack et al. |
| 10,031,061 | B2 | 7/2018 | Rowlen et al. |
| 10,036,697 | B2 | 7/2018 | Fox et al. |
| 10,451,534 | B2 | 10/2019 | Otsuka et al. |
| 10,557,786 | B2 | 2/2020 | Gibbons et al. |
| 10,627,331 | B2 | 4/2020 | Chandler |
| 2011/0061471 | A1 | 3/2011 | Rich et al. |
| 2011/0259749 | A1 | 10/2011 | Kanda |
| 2012/0308436 | A1 | 12/2012 | Kanda |
| 2013/0007903 | A1 | 1/2013 | Evans et al. |
| 2014/0051064 | A1 | 2/2014 | Van Den Engh |
| 2014/0377771 | A1 | 12/2014 | Bibette et al. |
| 2016/0290915 | A1* | 10/2016 | Chen ................... G01N 15/1459 |
| 2017/0241889 | A1 | 8/2017 | Otsuka et al. |
| 2017/0248515 | A1 | 8/2017 | Duckett, Jr. et al. |
| 2017/0307502 | A1 | 10/2017 | Mason et al. |
| 2017/0350878 | A1 | 12/2017 | Holmes et al. |
| 2019/0025212 | A1 | 1/2019 | Evans |
| 2020/0103406 | A1 | 4/2020 | Holmes et al. |
| 2020/0158545 | A1 | 5/2020 | Norton et al. |
| 2020/0271564 | A1* | 8/2020 | Buchanan ............ G01N 33/487 |

FOREIGN PATENT DOCUMENTS

| | | | |
|---|---|---|---|
| CN | 105143851 | A | 12/2015 |
| CN | 103517980 | B | 9/2016 |
| CN | 104755906 | B | 8/2017 |
| CN | 206818580 | U | 12/2017 |
| CN | 107782657 | A | 3/2018 |
| CN | 108169104 | A | 6/2018 |
| CN | 207649728 | U | 7/2018 |
| CN | 109070083 | A | 12/2018 |
| CN | 208537364 | U | 2/2019 |
| CN | 105980059 | B | 8/2019 |
| CN | 110361316 | | 10/2019 |
| CN | 111122422 | A | 5/2020 |
| EP | 998672 | A2 | 5/2000 |
| EP | 1574838 | A1 | 9/2005 |
| EP | 1099105 | B1 | 2/2006 |
| EP | 1757922 | A1 | 2/2007 |
| EP | 1391717 | B1 | 5/2008 |
| EP | 2702133 | A1 | 3/2014 |
| EP | 2917718 | A1 | 9/2015 |
| EP | 2984468 | A1 | 2/2016 |
| EP | 2357464 | B1 | 3/2016 |
| EP | 3189322 | A1 | 7/2017 |
| EP | 3206010 | A1 | 8/2017 |
| EP | 3445490 | A1 | 2/2019 |
| EP | 3090248 | B1 | 6/2020 |
| JP | 01-232602 | | 9/1989 |
| JP | 06-194300 | | 7/1994 |
| JP | 2006-250725 | | 9/2006 |
| JP | 2009-145044 | | 7/2009 |
| WO | 1999005504 | A2 | 2/1999 |
| WO | 01/27590 | A2 | 4/2001 |
| WO | 2004051238 | A1 | 6/2004 |
| WO | 2005106427 | A1 | 11/2005 |
| WO | 2007018087 | A1 | 2/2007 |
| WO | 2009078307 | A1 | 6/2009 |
| WO | 2011144208 | A2 | 11/2011 |
| WO | 2014127379 | A1 | 8/2014 |
| WO | 2016035284 | A1 | 3/2016 |
| WO | 2017072360 | A1 | 5/2017 |
| WO | 2018065349 | A1 | 4/2018 |
| WO | 2019127563 | A1 | 7/2019 |

* cited by examiner

CUVETTE ASSEMBLY, FLOW CELL COMPRISING THE CUVETTE ASSEMBLY, AND SAMPLE PROCESSOR CONTAINING THE CUVETTE ASSEMBLY OR THE FLOW CELL

This application is a U.S. National Stage Application of PCT/CN2021/127868 filed Nov. 1, 2021, which claims benefit of priority to Chinese Patent Application No. 202120186046.2, filed Jan. 22, 2021, and which applications are incorporated herein by reference in their entireties. To the extent appropriate, a claim of priority is made to each of the above-disclosed applications.

TECHNICAL FIELD

The utility model relates to a flow cell and cuvette assembly for a sample processor such as a flow cell sorter/analyzer, and the utility model also relates to a corresponding sample processor.

RELATED ART

The content in this section only provides background information related to the present disclosure, which does not necessarily constitute the prior art.

A sample processor is often used for analyzing and/or sorting samples such as microsomes or cells. A flow cell sorter/analyzer is an instrument for performing, based on flow cytometry, one-by-one, multi-parameter, and rapid qualitative/quantitative analysis and/or sorting of single-row cells or other biological particles in a fast linear flowing state, and usually includes a flow cell and a fluid system, a light source and an optical system, a sample analyzing and/or sorting system, and the like. The flow cell includes a sample detection area, such as a cuvette with a sample detection channel. Fluorescent staining is performed on cells or other particles to be tested, and a sample suspension is prepared. Droplets of the sample suspension are wrapped by a sheath liquid, then pass through the sample detection area of the flow cell and irradiated by the light source (generally a laser light source) in the sample detection area, and generate side-scattered light and fluorescence signals reflecting information of the samples. The optical signals are collected by the optical system, then converted and amplified, and processed and analyzed by a signal processing device. The sample sorting system, for example, can charge the sample droplets flowing out of the flow cell with different positive and negative charges according to results of signal processing and analysis, so that the sample droplets are deflected under the action of a high-voltage electric field and fall into different collection containers, thus realizing the sorting of samples.

The side-scattered light and fluorescence signals emitted by the cells or other biological particles in the sample detection area of the flow cell after irradiation by the laser are relatively weak and difficult to collect. Therefore, it is desired to design a cuvette assembly and a corresponding flow cell that can improve the efficiency of collecting scattered light and fluorescent light.

SUMMARY

This section provides a general summary of the present disclosure, rather than a comprehensive disclosure of the full scope of the present disclosure or all features of the present disclosure.

An objective of the utility model is to provide a cuvette assembly for a sample processor, which has a high efficiency of collecting scattered light and fluorescent light.

Another objective of the utility model is to provide a flow cell for a sample processor, which can improve the optical detection performance of the sample processor, especially the efficiency of collecting scattered light and fluorescent light.

Still another objective of the utility model is to provide a sample processor having an improved optical detection performance.

According to one aspect of the present disclosure, a cuvette assembly for a sample processor is provided. The cuvette assembly includes a cuvette body and a reflector. The cuvette body is in the shape of a rectangular parallelepiped and including a sample detection channel vertically penetrating the cuvette body. The cuvette body has long sides and short sides in a horizontal section. The reflector has a flat surface attached to a first side surface extending along one of the long sides of the cuvette body and a spherical surface that is opposite to the flat surface and has a truncated lower half. The reflector is positioned so that it is flush with a lower surface of the cuvette body and a center of sphere of the spherical surface falls into the sample detection channel, and the reflector extends along the long side and exceeds the short side.

The partially truncated lower half of the spherical surface of the reflector facilitates subsequent sample sorting and other processing. The length of the reflector is greater than the length of the cuvette body, which enlarges the area of the reflector that can receive side-scattered light and fluorescent light, thereby significantly improving the efficiency of collecting the side-scattered light and fluorescent light.

In some examples according to the present disclosure, the cuvette assembly may further include a focusing and shaping lens attached to a second side surface extending along one of the short sides of the cuvette body, and the focusing and shaping lens focuses an incident light to the center of sphere of the spherical surface of the reflector.

In some examples according to the present disclosure, the cuvette assembly may further include an aspheric lens attached to a third side surface opposite to the first side surface of the cuvette body, and the aspheric lens shapes a focused spot formed by reflection of the reflector and focuses the focused spot into a signal detection device for detecting optical signals.

In some examples according to the present disclosure, the aspheric lens includes a shaping part for shaping and an outer frame surrounding the shaping part, and a central part of the shaping part is thicker than a peripheral part.

In some examples according to the present disclosure, the sample detection channel has a square cross section.

According to another aspect of the present disclosure, a flow cell for a sample processor is provided. The flow cell includes a frame, a flow cell body, and a nozzle assembly. The flow cell body is fixed to the frame, and the flow cell body includes a base and the cuvette assembly according to the above aspect. The cuvette assembly is located below the base. A sample from a sample line and a fluid from a fluid line are converged in the base and flow into a sample detection channel in the cuvette assembly. The nozzle assembly has a nozzle that is located at an outlet of the sample detection channel and ejects the sample in the sample detection channel in a predetermined mode.

In some examples according to the present disclosure, the base may include a vertical channel, the channel has a smooth inner surface and includes a smoothly transitioned cylindrical section and a tapered section, so that the sample and the fluid are converged in the channel, and the tapered channel is aligned to the sample detection channel concentrically.

In some examples according to the present disclosure, the base may further include symmetrically arranged fluid ports in communication with the fluid line and the channel, and the fluid ports are higher than an outlet of the sample line.

In some examples according to the present disclosure, the base may further include a debubbling channel, one end of the debubbling channel is in communication with the channel and the other end is attached to a debubbling device.

In some examples according to the present disclosure, the debubbling channel is higher than the fluid port.

In some examples according to the present disclosure, the debubbling channel is disposed at a top of the channel.

In some examples according to the present disclosure, a top surface for defining the channel is inclined to guide discharging of bubbles.

In some examples according to the present disclosure, the flow cell body may further include a cover member, the cover member is located above the base, and the cover member causes the sample line to be aligned to the channel concentrically.

In some examples according to the present disclosure, the nozzle assembly is installed in the flow cell in an independently detachable manner.

In some examples according to the present disclosure, a cavity for arranging a piezoelectric element is disposed at a top of the base.

In some examples according to the present disclosure, the cavity for arranging the piezoelectric element is an annular cavity surrounding the sample line.

In some examples according to the present disclosure, a tail end of the sample line includes a rigid elongated member.

In some examples according to the present disclosure, the sample line extends into the tapered section of the channel.

In some examples according to the present disclosure, the outlet of the sample line is tapered.

According to yet another aspect of the present disclosure, a sample processor is provided, including the cuvette assembly and/or flow cell according to the above aspect.

In some examples according to the present disclosure, such a sample processor is a sample sorter.

BRIEF DESCRIPTION OF THE DRAWINGS

Through the following description with reference to accompanying drawings, the features and advantages of one or more embodiments of the present disclosure will become easier to understand, and in the accompanying drawings.

DETAILED DESCRIPTION

Figure 1:
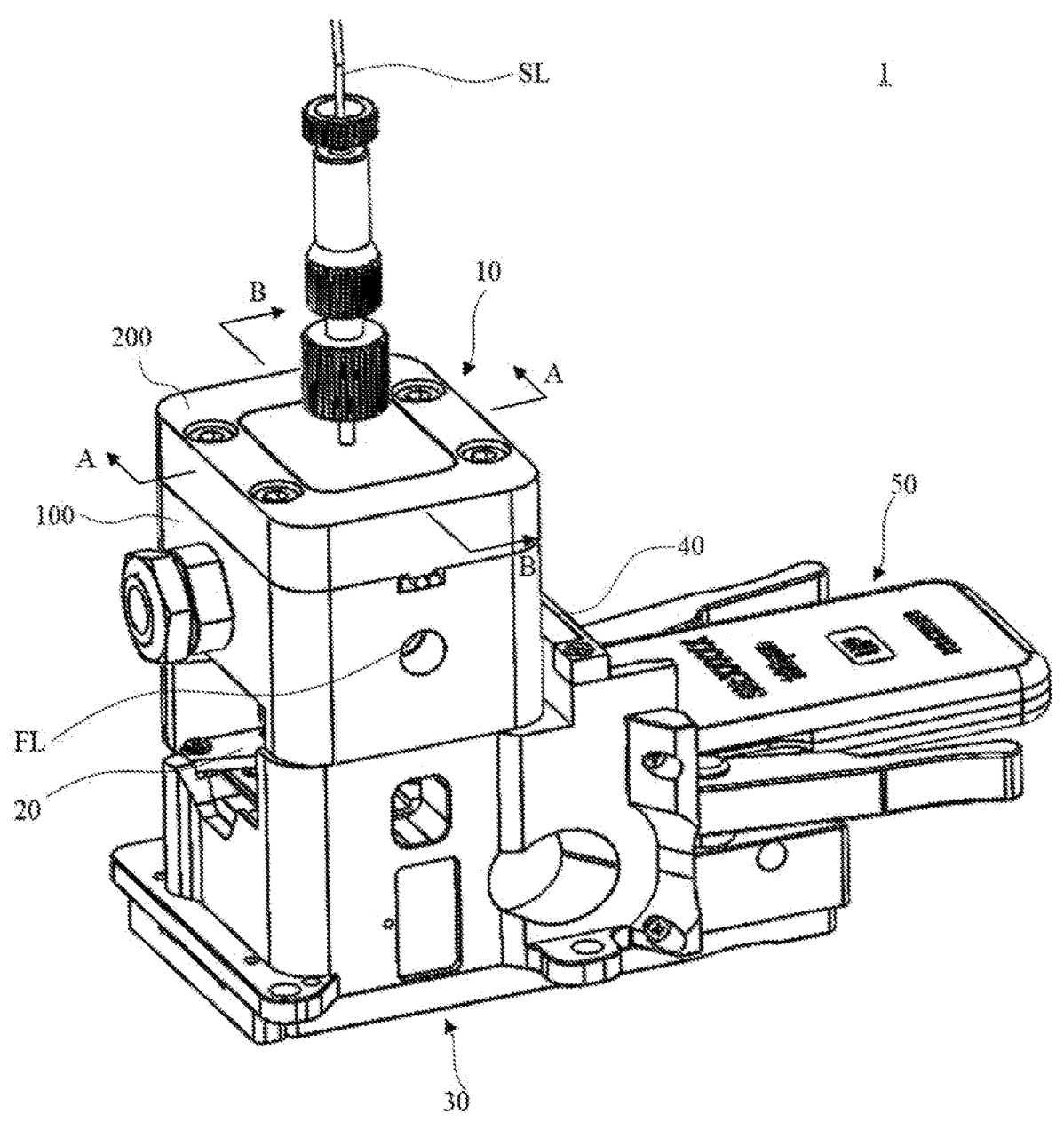
FIG. 1 is a three-dimensional schematic view of a sample processor according to an embodiment of the present disclosure.

The present disclosure will be described below in detail through example embodiments with reference to the accompanying drawings. In the several accompanying drawings, similar reference numerals indicate similar parts and components. The following detailed description of the present disclosure is for illustrative purposes only, and is by no means limiting the present disclosure and its applications or uses. The embodiments described in this specification are not exhaustive, but are only some of several possible embodiments. The example embodiments may be implemented in many different forms, and should not be construed as limiting the scope of the present disclosure. In some example embodiments, well-known processes, well-known device structures, and well-known technologies may not be described in detail.

Figure 2A:
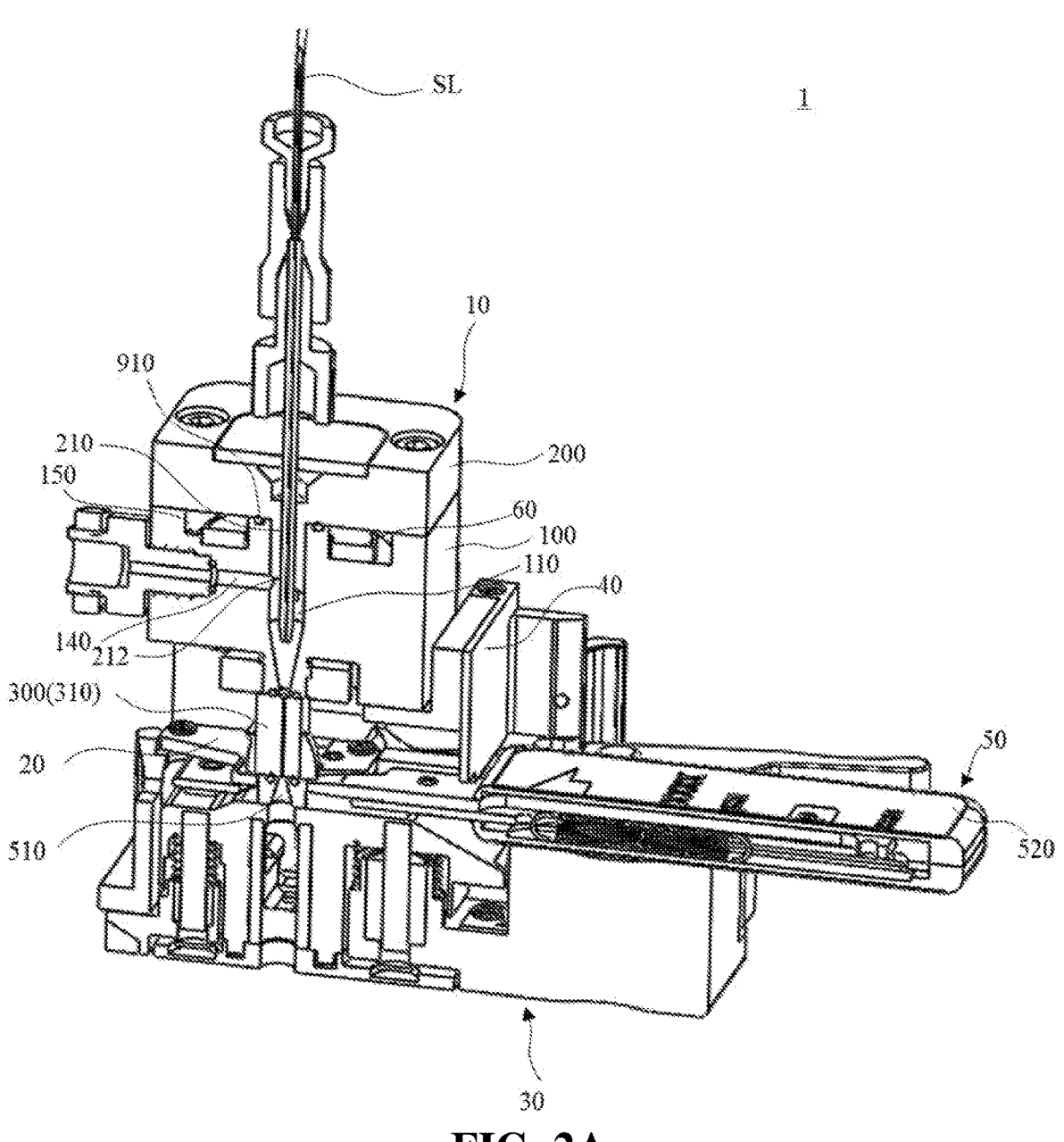
FIG. 2A is a three-dimensional sectional view of the sample processor taken along section line A-A in FIG. 1.
Figure 2B:
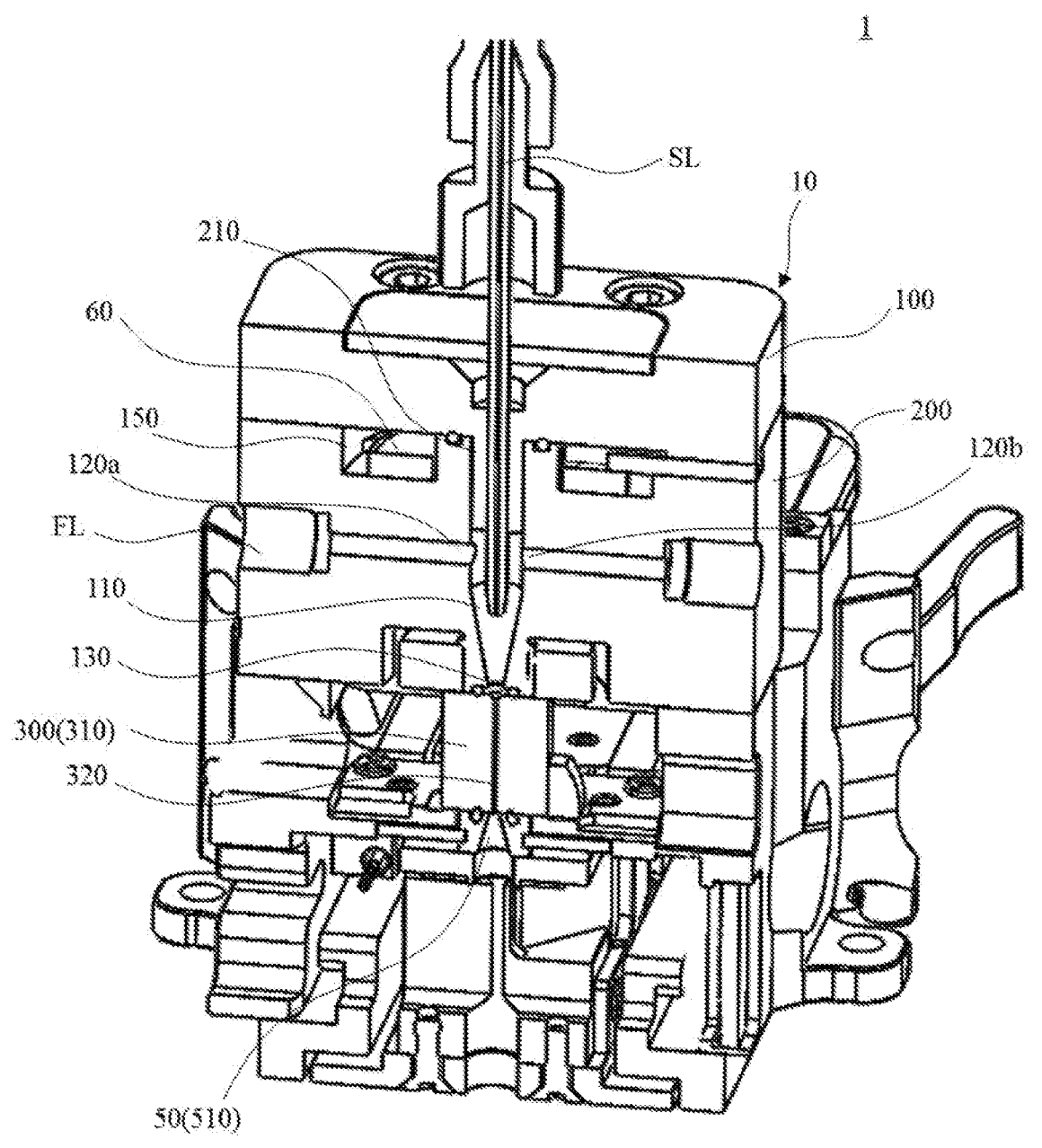
FIG. 2B is a three-dimensional sectional view of the sample processor taken along section line B-B in FIG. 1.

FIG. 1 is a three-dimensional schematic view of flow cell 1 for a sample processor according to an embodiment of the present disclosure. FIG. 2A is a three-dimensional sectional view of flow cell 1 taken along section line A-A in FIG. 1, and FIG. 2B is a three-dimensional sectional view of flow cell 1 taken along section line B-B in FIG. 1. The overall structure of flow cell 1 will be described below with reference to FIG. 1 to FIG. 2B.

As shown in FIG. 1 to FIG. 2B, flow cell 1 includes flow cell body 10, positioning member 20, supporting member 30, frame 40, and nozzle assembly 50. Frame 40 serves as a fixing component of flow cell 1 and is used for supporting and installing other components. Flow cell body 10, positioning member 20, and supporting member 30 are all directly or indirectly fixed to frame 40.

The various components of flow cell 1 shown in FIG. 1 to FIG. 2B are assembled in place and in a working state. When flow cell 1 is operating, flow cell body 10 receives a sample from a sample line SL and a fluid such as a sheath fluid from a fluid line FL. The sample and the sheath fluid are converged in flow cell body 10 and then ejected through nozzle assembly 50. The sample is detected and analyzed when the sample flows through flow cell body 10, and then the sample ejected from nozzle assembly 50 is sorted based on results of the detection and analysis.

Flow cell body 10 may include base 100, as well as cover member 200 and cuvette assembly 300 respectively located on upper and lower sides of base 100. Base 100 cooperates with cover member 200 so that the sample and the sheath fluid are converged and flow into cuvette assembly 300, and the sample is detected in cuvette assembly 300.

Base 100 is provided with vertical channel 110 and symmetrically arranged fluid ports 120a and 120b in communication with fluid line FL, and the sheath fluid flows into channel 110 via fluid ports 120a and 120b. Channel 110 has a smooth inner surface and includes a smoothly transitioned substantially cylindrical section and a tapered section, and outlet 130 is defined at the tapered section. A center of cover member 200 is provided with a through hole and annular protrusion 210 extending vertically downward around the through hole to be inserted into the substantially cylindrical section of channel 110. An inner surface of annular protrusion 210 defines a sample port for enabling sample line SL to be inserted into channel 110 and enabling sample line SL to be positioned concentrically with respect to channel 110.

A tail end of sample line SL usually includes a rigid elongated member, such as a sample probe, so as to be inserted into channel 110 and positioned concentrically with respect to channel 110. An outlet of sample line SL generally extends into the tapered section of channel 110 to facilitate the convergence of the sample and the sheath fluid to form a uniform and stable sample flow. Preferably, the outlet of sample line SL is designed as a tapered tip, so as to reduce the influence of the sample on the stability of a laminar flow of the sheath fluid. Sample line SL is locked by screws on cover member 200. Base 100 and cover member 200 are fixed by screws, and O-ring 910 for sealing is disposed around annular protrusion 210 between base 100 and cover member 200.

The sample from the sample line SL and the sheath fluid from the fluid line FL are converged in channel 110. The smooth inner surface and simple structure of channel 110 can promote the convergence of the sample flow and the sheath liquid flow to form a uniform and stable laminar flow, thus avoiding fluid disturbance or flow dead zones, and reducing the chance of bubble accumulation and adhesion. Compared with existing flow cytometers available in the market, channel 110 reduces the volume and surface area of the channel, thereby minimizing the chance of bubbles adhering to the inner surface of channel 110. In addition, the smaller volume of channel 110 increases the flow velocity of the fluid, thereby facilitating the elimination of bubbles.

Fluid ports 120a and 120b are disposed to be sufficiently high with respect to the outlet of sample line SL to ensure that the sheath fluid has fully developed into the laminar flow when it reaches the outlet of sample line SL, so that the sample and the sheath fluid form a uniform, tight, and stable sample flow when they are converged. In addition, the symmetrical arrangement of fluid ports 120a and 120b allows the sheath fluid to be injected symmetrically to enhance stability of the fluid.

Base 100 may further include debubbling channel 140. One end of debubbling channel 140 is in communication with channel 110, and the other end may be attached to a debubbling device, such as a vacuum pump, for fully discharging bubbles in channel 110. Debubbling channel 140 is disposed at a top of channel 110 and is disposed higher than fluid ports 120a and 120b to remove bubbles from above fluid ports 120a and 120b, which can minimize the influence of the debubbling process on the fluid stability. At a junction of debubbling channel 140 and channel 110, an end portion of annular protrusion 210 of cover member 200 may be disposed as inclined surface 212 to guide bubbles to discharge, thus preventing the bubbles from accumulating in the flow dead zone at the top of channel 110. In addition to removing bubbles, debubbling channel 140 and the debubbling device can also function to clean up blockages.

Annular cavity 150 surrounding sample line SL is disposed on the top of base 100, for arranging annular piezoelectric element 60. Piezoelectric element 60 may be bonded in annular cavity 150.

It should be understood that the structures of above base 100 and cover member 200 can be changed according to needs, and are not limited to the specific examples shown in FIG. 1 to FIG. 2B. In other embodiments, cover member 200 may even be omitted.

Cuvette assembly 300 is a component that allows light to pass through for optical detection of the sample, and is fixed below outlet 130 of the tapered section of channel 110. Cuvette assembly 300 includes light-transmissive cuvette body 310 provided with sample detection channel 320. Sample detection channel 320 has an upper end aligned to outlet 130 of the tapered section, and a lower end connected to nozzle assembly 50 and aligned to nozzle 510 in nozzle assembly 50.

Figure 3:
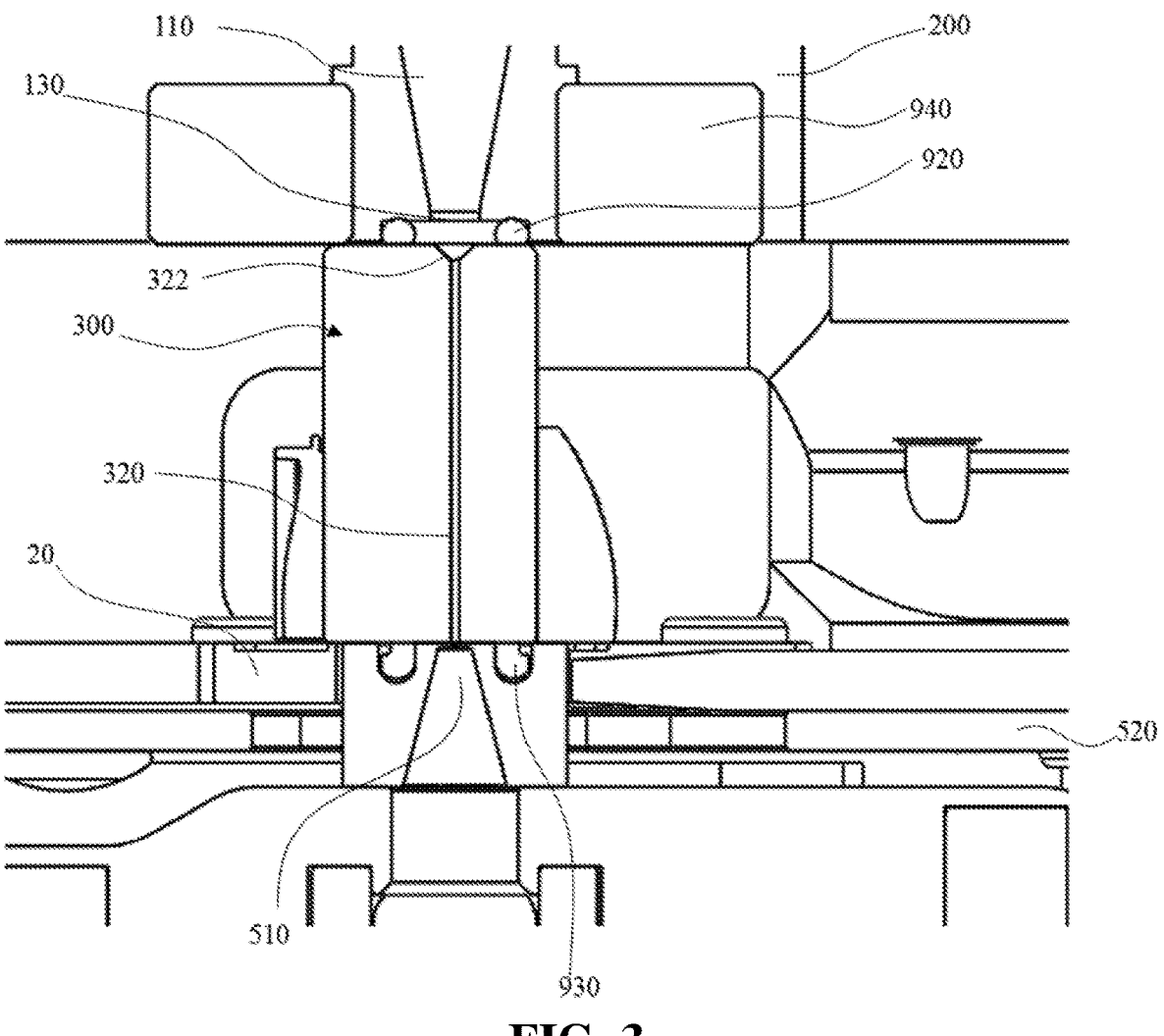
FIG. 3 is a partial enlarged view corresponding to the three-dimensional sectional view shown in FIG. 2A.

FIG. 3 is an enlarged view of cuvette assembly 300 in an assembled state. As shown in FIG. 3, cuvette assembly 300 is firmly fixed to substantially plate-shaped positioning member 20 by bonding or another connection method that does not affect the optical performance of cuvette assembly 300. During installation, a high-precision assembly tool is used to ensure that sample detection channel 320 is concentrically aligned to outlet 130 of upstream channel 110. Tapered transition section 322 is disposed around an upper opening of sample detection channel 320 to guide the liquid flow from the tapered section of channel 110. Positioning member 20 is provided with a limiting structure that receives and guides nozzle 510 so that nozzle 510 and sample detection channel 320 are automatically aligned. Preferably, nozzle 510 is independently detachable without affecting its peripheral components, so that nozzle 510 and cuvette assembly 300 can be conveniently cleaned without moving cuvette assembly 300, and it is unnecessary to realign the detection light path after repeated disassembling and assembling of cuvette assembly 300. In this embodiment, nozzle assembly 50 further includes carrier 520 that carries nozzle 510 to facilitate independent detaching of nozzle 510. O-rings 920 and 930 for sealing are respectively disposed around a coupling part between sample detection channel 320 and outlet 130 of channel 110 and a coupling part between sample detection channel 320 and nozzle 510. The top of cuvette assembly 300 is pressed tightly by nut 940 to ensure positioning.

When the sample is optically inspected, the sample flows into channel 110 through elongated sample line SL under pressure and is immediately wrapped by the sheath fluid, and then flows into cuvette assembly 300 together with the sheath fluid along the tapered section of channel 110. The sample is, for example, a fluorescently labeled single cell suspension. The sheath liquid wrapping the sample passes through sample detection channel 320 in cuvette body 310 and is ejected through nozzle 510. Piezoelectric element 60 vibrates at a high frequency under the action of an electric signal, so that the sheath liquid flow which is ejected from nozzle 510 and wraps the sample droplets is uniformly broken to form discrete droplets for subsequent sample sorting. In sample detection channel 320, the sample droplets wrapped by the sheath fluid are irradiated by laser or another light source and emit scattered light and fluorescence signals reflecting sample information. An optical system of the sample processor collects the optical signals, and then the optical signals are processed and analyzed to detect and analyze the samples. Subsequently, the sample sorting system sorts the samples ejected from nozzle 510 based on results of the detection and analysis.

The specific structure, operation principle, and beneficial effects of cuvette assembly 300 will be described in detail below.

Figures 4A, 4B:
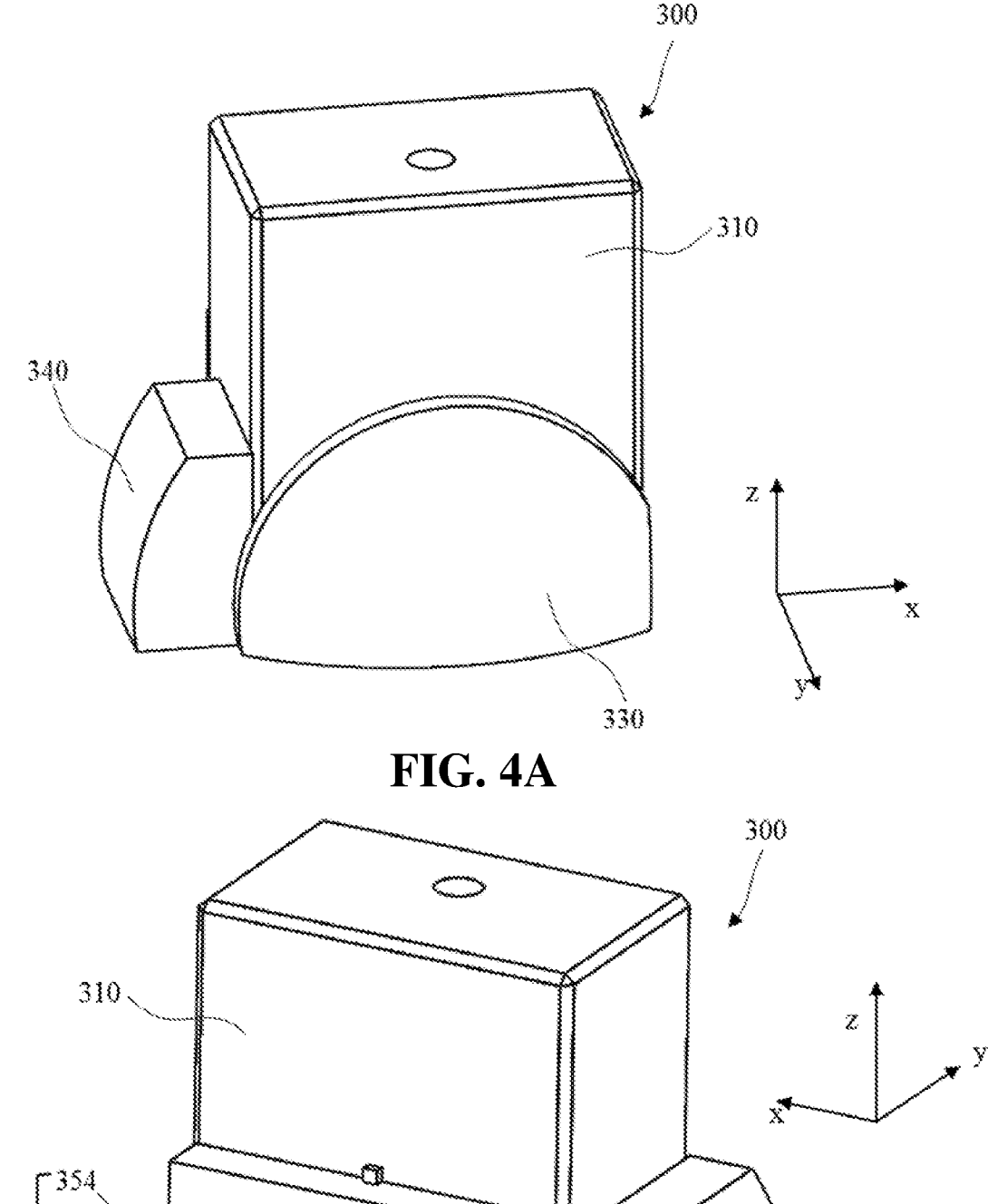
FIG. 4A and FIG. 4B are three-dimensional views of a cuvette assembly according to an embodiment of the present disclosure viewed from different angles.
Figures 4C, 4D:
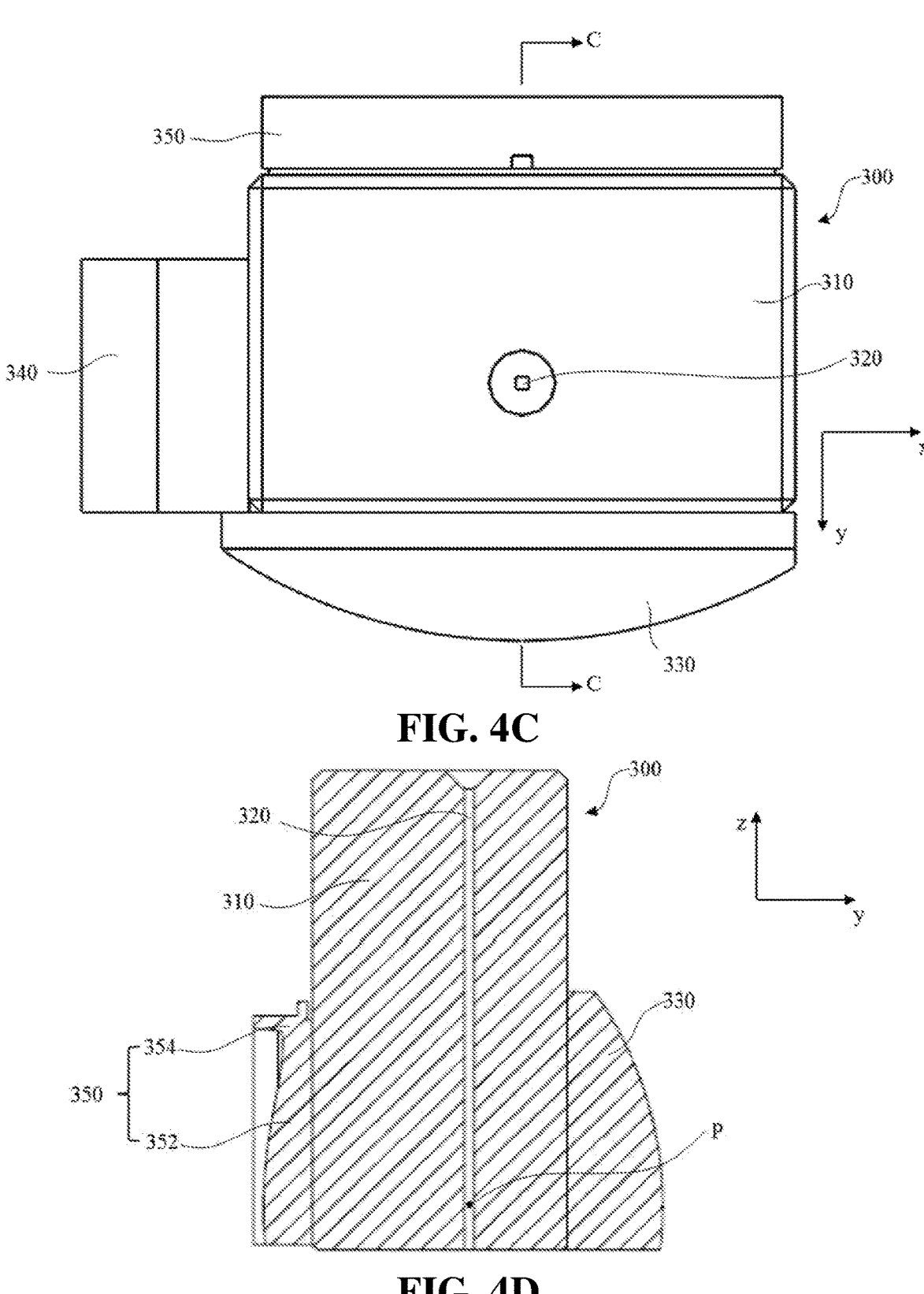
FIG. 4C is a top view of the cuvette assembly.
FIG. 4D is a cross-sectional view of the cuvette assembly taken along section line C-C in FIG. 4C.

FIG. 4A and FIG. 4B are three-dimensional views of cuvette assembly 300 from different angles, FIG. 4C is a top view of cuvette assembly 300, and FIG. 4D is a cross-sectional view taken along section line C-C in FIG. 4C.

As shown in FIG. 4A to FIG. 4D, cuvette body 310 in cuvette assembly 300 is a roughly rectangular parallelepiped component, which can be made of fused silica glass or another suitable light-transmissive material. For ease of description, long sides and short sides of cuvette body 310 in a horizontal section are defined. In this embodiment, cuvette body 310 has a length of about 8.2 mm, a width of about 5.2 mm, and a height of about 10 mm. Sample detection channel 320 vertically penetrates cuvette body 310 in a height direction of cuvette body 310 (the z direction in FIG. 4A to FIG. 4D). As shown in FIG. 4C, sample detection channel 320 has a square cross section.

Cuvette assembly 300 also includes reflector 330 disposed on one side surface (referred to as a first side surface below) extending along one of the long sides of cuvette body 310, and used for reflecting and focusing side-scattered light and fluorescent light emitted by the sample droplets. A lower surface of reflector 330 is flush with a lower surface of cuvette body 310, so that cuvette assembly 300 is installed on substantially plate-shaped positioning member 20. Reflector 330 is a part of a spherical mirror, and specifically includes a flat surface attached to the first side surface of cuvette body 310 and a spherical surface that is opposite to the flat surface and has a truncated lower half. The spherical surface is coated with a reflective film. Reflector 330 extends along the long side of cuvette body 310 beyond the short side of cuvette body 310, that is, the flat surface of reflector 330 is slightly longer than the first side surface of cuvette body 310. In this embodiment, reflector 330 slightly exceeds a front side surface (referred to as a second side surface below) of cuvette body 310 extending along its short side, and is flush with a rear side surface of cuvette body 310. In this embodiment, reflector 330 has a length of about 8.6 mm, and a maximum height of about 5.4 mm.

Cuvette assembly 300 may further include focusing and shaping lens 340 for shaping an incident light and focusing the incident light into sample detection channel 320. Focusing and shaping lens 340 may be attached to the second side surface of cuvette body 310 and abut against reflector 330 that slightly exceeds the second side surface, so that the structure of cuvette assembly 300 is more compact and light loss is reduced.

Cuvette assembly 300 may further include aspheric lens 350 disposed opposite to reflector 330, for shaping a focused spot of scattered light and fluorescent light formed by reflector 330 and focusing the spot into a signal detection device for detecting optical signals. Aspheric lens 350 may be attached to a third side surface of cuvette body 310 opposite to the first side surface, so that the structure of cuvette assembly 300 is more compact and light loss is reduced. Aspheric lens 350 includes shaping part 352 for shaping and outer frame 354 surrounding shaping part 352. A peripheral edge of shaping part 352 is substantially circular, and a central part near the center of shaping part 352 is thicker than the peripheral part.

Similar to reflector 330, lower surfaces of focusing and shaping lens 340 and aspheric lens 350 are flush with the lower surface of cuvette body 310 to facilitate the installation of cuvette assembly 300.

When optically detecting the sample, a laser light is incident in the length direction of cuvette body 310 (the x direction in FIG. 4A to FIG. 4D) through focusing and shaping lens 340, and focusing and shaping lens 340 shapes the incident laser light and focuses it in sample detection channel 320. The focal point is referred to as a laser interrogation point P (shown in FIG. 4D). The sample droplets (such as fluorescently labeled cells) wrapped by the sheath fluid are irradiated by the laser light and emit scattered light and fluorescent light when they pass through the laser interrogation point P in sample detection channel 320. In this embodiment, the laser interrogation point P in sample detection channel 320 is set at the center of sphere of the spherical surface of reflector 330, so that reflector 330 can reflect and focus the scattered light and fluorescent light within the maximum range.

Figures 5A, 5B:
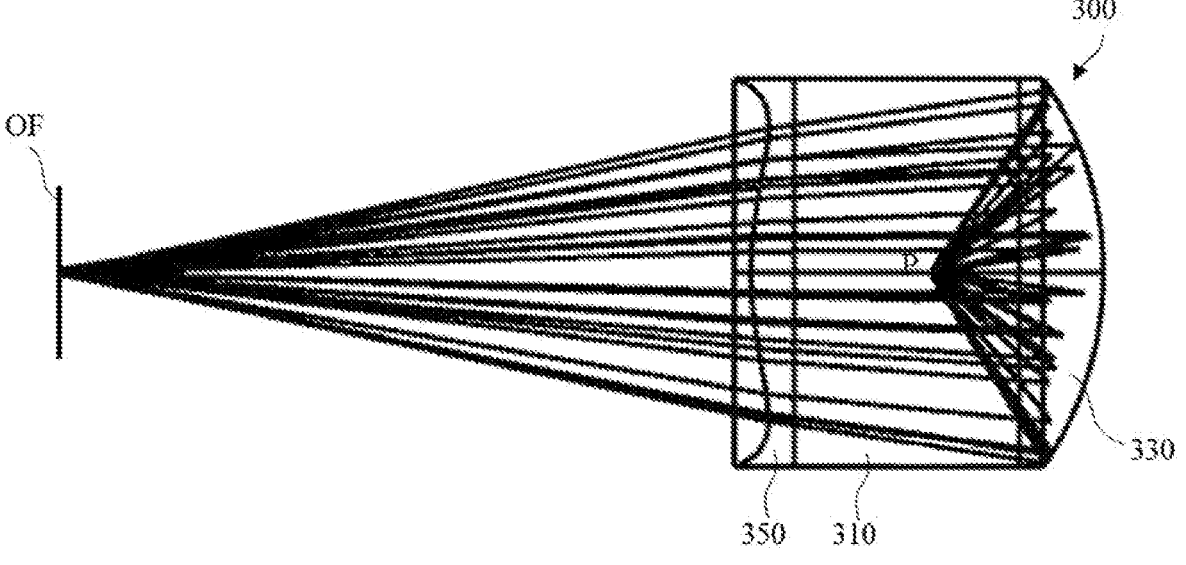
FIG. 5A and FIG. 5B are respectively schematic light path views of collecting side-scattered light and fluorescent light observed from above and from a lateral side of the cuvette assembly.

FIG. 5A and FIG. 5B are respectively schematic light path views of collecting side-scattered light and fluorescent light viewed from above and from a lateral side of cuvette assembly 300. As shown in FIG. 5A and FIG. 5B, the scattered light and fluorescent light diverging from the laser interrogation point P in various directions are reflected and focused by reflector 330, and then shaped by aspheric lens 350 and focused on an optical fiber OF of the signal detection device. The scattered light and fluorescent light emitted by different laser excited samples will be converged at different focal points after reflection, shaping, and focusing. For example, FIG. 5B shows that different scattered light or fluorescent light generated by excitations of 4 different lasers may be distinguished.

Reflector 330 according to the utility model is not a complete spherical mirror, but a spherical mirror having a spherical surface with a partially truncated lower half. Therefore, the center of sphere of the spherical surface of reflector 330, that is, the laser interrogation point P, is closer to nozzle 510, thereby shortening the delay time of the droplet from the laser interrogation point P to nozzle 510, and obtaining improved sorting performance. On the other hand, since the area size of the flat surface of reflector 330 affects the range that reflector 330 can cover, which in turn affects an angular range of light that reflector 330 can receive, shortening the reflector will affect the efficiency of collecting the side-scattered light and the fluorescent light. In order to compensate for the loss of light collection efficiency caused by the truncated reflector, the flat surface of reflector 330 in the utility model is configured to be slightly longer than the first side surface of cuvette body 310, thereby expanding the area of reflector 330 receiving the side-scattered light and the fluorescent light. A numerical aperture NA is commonly used in the optical system to measure the angular range of light that the system can collect. The numerical aperture of a conventional side-scattered light and fluorescent light collection system using a lens method is about 0.6, while the numerical aperture of reflector 330 in the utility model that can receive scattered light and fluorescence signals can reach 1.25. Therefore, cuvette assembly 300 according to the utility model improves the sorting performance of the sample processor and greatly improves the efficiency of collecting side-scattered light and fluorescent light, thus having higher resolution and sensitivity.

The shape and area of a cross section of sample detection channel 320 are important factors that affect the speed of the sample droplet at the laser interrogation point P. A higher speed of the sample droplet passing the laser interrogation point P results in a better sorting performance, but the increase in speed will increase the difficulty of optical detection and weaken the optical performance. As shown in FIG. 4C, in this embodiment, the cross section of sample detection channel 320 is square. The size of sample detection channel 320 is determined based on factors such as the shape of sample detection channel 320, the size of the sample droplets, the flow rates of the sample and the sheath fluid, and a desired speed of the sample droplet when passing the laser interrogation point P. In this embodiment, sample detection channel 320 is configured to have a square cross section with a size of approximately 200 μm×200 μm. The shape and size design of sample detection channel 320 according to the utility model slightly increase the speed of the sample droplets at the laser interrogation point P as compared with that of existing flow cytometers available in the market, so that the sorting performance is improved without excessively reducing the optical performance.

As can be seen more clearly from FIG. 4C, sample detection channel 320 is approximately centered in the length direction of cuvette body 310, so that reflector 330 can capture and reflect scattered light and fluorescent light within a maximum range. However, sample detection channel 320 is asymmetrically disposed in the width direction of cuvette body 310 (the y direction in the drawing), that is, a distance between sample detection channel 320 and aspheric lens 350 is different from a distance between sample detection channel 320 and reflector 330. For example, in this embodiment, the distance from the center of sample detection channel 320 to reflector 330 is 2 mm, and the distance to aspheric lens 350 is 3.2 mm. This asymmetrical design makes cuvette body 310 thicker and expands the area where cuvette body 310 abuts against its upstream and downstream components, so that a high-pressure fluid can be sealed more tightly.

It should be understood that although the special design of reflector 330 and sample detection channel 320 causes cuvette assembly 300 and flow cell 1 according to the present disclosure more suitable for a sample sorter with a sorting function, such a cuvette assembly and flow cell can also be applied to a sample analyzer or another sample processor without a sorting function.

Although the present disclosure has been described with reference to example embodiments, it should be understood that the present disclosure is not limited to the specific embodiments described and illustrated in the text. Without departing from the scope defined by the claims, those skilled in the art can make various changes to the example embodiments. Provided that there is no contradiction, features in the various embodiments can be combined with each other. Alternatively, a certain feature in the embodiment may also be omitted.

The invention claimed is:

1. A cuvette assembly for a sample processor, comprising:
a cuvette body in the shape of a rectangular parallelepiped and comprising a sample detection channel vertically penetrating the cuvette body, the cuvette body having long sides and short sides in a horizontal section; and
a reflector having a flat surface attached to a first side surface extending along one of the long sides of the cuvette body and a spherical surface that is opposite to the flat surface and has a truncated lower half, wherein the spherical surface is reflective, and
wherein the reflector is positioned so that it is flush with a lower surface of the cuvette body and a center of sphere of the spherical surface falls into the sample detection channel, and the reflector extends along the long side and exceeds the short side.

2. The cuvette assembly according to claim 1, wherein the cuvette assembly further comprises a focusing and shaping lens attached to a second side surface extending along one of the short sides of the cuvette body, and the focusing and shaping lens focuses an incident light to the center of sphere of the spherical surface of the reflector.

3. The cuvette assembly according to claim 2, wherein the cuvette assembly further comprises an aspheric lens attached to a third side surface opposite to the first side surface of the cuvette body, and the aspheric lens shapes a focused spot formed by reflection of the reflector and focuses the focused spot into a signal detection device for detecting optical signals.

4. The cuvette assembly according to claim 3, wherein the aspheric lens comprises a shaping part for shaping and an outer frame surrounding the shaping part, and a central part of the shaping part is thicker than a peripheral part.

5. The cuvette assembly according to claim 1, wherein the sample detection channel has a square cross section.

6. A flow cell for a sample processor, comprising: a frame; a flow cell body fixed to the frame, the flow cell body comprising a base and the cuvette assembly according to claim 1, wherein the cuvette assembly is located below the base, and a sample from a sample line and a fluid from a fluid line are converged in the base and flow into the sample detection channel in the cuvette assembly; and a nozzle assembly having a nozzle that is located at an outlet of the sample detection channel and ejects the sample in the sample detection channel in a predetermined mode.

7. The flow cell according to claim 6, wherein the base comprises a vertical channel, the vertical channel has an inner surface and comprises a cylindrical section and a tapered section, so that the sample and the fluid are converged in the vertical channel, and the tapered section is aligned to the sample detection channel concentrically.

8. The flow cell according to claim 7, wherein the base further comprises symmetrically arranged fluid ports in communication with the fluid line and the vertical channel, and the fluid ports are higher than an outlet of the sample line.

9. The flow cell according to claim 8, wherein the base further comprises a debubbling channel, one end of the debubbling channel is in communication with the vertical channel and the other end is attached to a debubbling device.

10. The flow cell according to claim 9, wherein the debubbling channel is higher than the fluid ports.

11. The flow cell according to claim 10, wherein the debubbling channel is disposed at a top of the vertical channel.

12. The flow cell according to claim 11, wherein a top surface for defining the vertical channel is inclined to guide discharging of bubbles.

13. The flow cell according to claim 7, wherein the flow cell body further comprises a cover member, the cover member is located above the base, and the cover member causes the sample line to be aligned to the vertical channel concentrically.

14. The flow cell according to claim 7, wherein the sample line extends into the tapered section of the vertical channel.

15. The flow cell according to claim 14, wherein the outlet of the sample line is tapered.

16. The flow cell according to claim 6, wherein the nozzle assembly is installed in the flow cell in an independently detachable manner.

17. The flow cell according to claim 6, wherein a cavity for arranging a piezoelectric element is disposed at a top of the base.

18. The flow cell according to claim 17, wherein the cavity is an annular cavity surrounding the sample line.

19. The flow cell according to claim 6, wherein a tail end of the sample line comprises a rigid elongated member.

20. A sample processor, comprising the flow cell according to claim 6.

21. A sample processor, comprising the cuvette assembly according to claim 1.

22. The sample processor according to claim 21, wherein the sample processor is a sample sorter.

* * * * *